(12) United States Patent
Yasukawa et al.

(10) Patent No.: US 10,168,581 B2
(45) Date of Patent: Jan. 1, 2019

(54) DISPLAY DEVICE

(71) Applicant: Panasonic Liquid Crystal Display Co., Ltd., Hyogo (JP)

(72) Inventors: Hironori Yasukawa, Hyogo (JP); Teruhisa Nakagawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 98 days.

(21) Appl. No.: 15/291,428

(22) Filed: Oct. 12, 2016

(65) Prior Publication Data

US 2017/0102576 A1 Apr. 13, 2017

(30) Foreign Application Priority Data

Oct. 13, 2015 (JP) .................. 2015-202477

(51) Int. Cl.
*G02F 1/1339* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC ........ *G02F 1/13394* (2013.01); *G02F 1/1368* (2013.01); *G02F 1/133345* (2013.01); *G02F 1/134309* (2013.01); *G02F 1/136286* (2013.01); *G02F 2001/13396* (2013.01); *G02F 2001/13629* (2013.01); *G02F 2201/121* (2013.01); *G02F 2201/123* (2013.01)

(58) Field of Classification Search
CPC ........... G02F 1/13394; G02F 1/136286; G02F 1/1368; G02F 1/134309; G02F 1/133345; G02F 2201/123; G02F 2201/121; G02F 2001/13396; G02F 2001/13629
USPC ........................................... 349/141
See application file for complete search history.

(56) References Cited

U.S. PATENT DOCUMENTS

| 8,835,925 | B2* | 9/2014 | Kim ............... G02F 1/13439 257/59 |
| 9,261,740 | B2* | 2/2016 | Kibe ................ G02F 1/137 |
| 9,679,825 | B2* | 6/2017 | Choi ............... H01L 23/3192 |
| 2009/0121996 | A1 | 5/2009 | Takano et al. |
| 2015/0160519 | A1* | 6/2015 | Cho ................. G02F 1/1339 349/138 |

FOREIGN PATENT DOCUMENTS

| JP | 2002-196338 | 7/2002 |
| JP | 2009-122299 | 6/2009 |
| JP | 2015007677 A * | 1/2015 |

* cited by examiner

*Primary Examiner* — Hoan C Nguyen
(74) *Attorney, Agent, or Firm* — Wenderoth, Lind & Ponack, L.L.P.

(57) ABSTRACT

A display device comprises spacers provided between a first substrate and a second substrate, wherein the first substrate includes: seats each of which holds the spacers, respectively; data lines; gate lines; thin film transistors; pixel electrodes corresponding to pixel regions; a common electrode facing the pixel electrodes; and common wirings being electrically connected to the common electrode, and each of the common wirings includes a bent part detouring around at least one of the seats.

9 Claims, 7 Drawing Sheets

DISPLAY DEVICE

CROSS-REFERENCE TO RELATED APPLICATION

This application claims priority from Japanese application JP2015-202477, filed Oct. 13, 2015. This Japanese application is incorporated herein by reference.

TECHNICAL FIELD

The present invention relates to a display device.

BACKGROUND

In a liquid crystal display device, light transmission is controlled by alignment of liquid crystal sealed between first and second substrates, thereby displaying an image. The first substrate includes a plurality of data lines extending in a column direction, a plurality of gate lines extending in a row direction, and a plurality of thin film transistors formed near intersection parts of the pluralities of data lines and gate lines. In an in plane switching (IPS)-system liquid crystal display device, the first substrate includes a pixel electrode and a common electrode.

In the liquid crystal display device, a plurality of spacers are disposed in order to hold a distance (gap) between the first substrate and the second substrate. A seat is formed in the first substrate, a spacer is formed in the second substrate, and the first substrate and the second substrate adhere to each other such that the seat and the spacer contact with each other, thereby holding the gap. Desirably, the spacer is disposed at a position where a numerical aperture of the pixel is not degraded. For example, JP 2002-196338 A discloses a spacer disposed between two adjacent thin film transistors. Japanese unexamined patent application publication JP2009-12229A discloses a counter voltage signal line (common wiring) that is formed along a running direction of the gate line while superposed on the gate line in order to improve a numerical aperture of a pixel, the counter voltage signal line supplying a reference signal to a counter electrode (common electrode).

SUMMARY

However, nowadays high resolution reduces a region where the spacer is disposed in the display device, and the spacer contacts with a region that is not a seat because of misregistration during adhesion between the substrates, which results in a risk of occurrence of a display defect such as display unevenness. Particularly, in the case that the common wiring is formed along the gate line while superposed on the gate line, a laminated structure is raised in a region where the common wiring is formed, and the spacer contacts easily with the region.

An object of the present disclosure is to provide a display device preventing the spacer from contacting with the region that is not the seat.

To solve the above problem, a display device according to the present disclosure comprises: a first substrate; a second substrate facing the first substrate; and a plurality of spacers provided between the first substrate and the second substrate, wherein the first substrate includes: a plurality of seats which hold the plurality of spacers, respectively; a plurality of data lines extending in a column direction; a plurality of gate lines extending in a row direction; a plurality of thin film transistors each of which is formed near a respective intersection part of the plurality of data lines and the plurality of gate lines; a plurality of pixel electrodes corresponding to a plurality of pixel regions, respectively, the plurality of pixel regions being arrayed in the row and column directions; a common electrode that faces the plurality of pixel electrodes; and a plurality of common wirings that extend in the row direction and that are electrically connected to the common electrode, and each of the common wirings includes a bent part detouring around at least one of the plurality of seats.

In the display device according to the present disclosure, the plurality of seats may include a first seat and a second seat having a surface area smaller than that of the first seat, and the bent part of at least one of the common wirings may be formed so as to detour around the first seat.

In the display device according to the present disclosure, the plurality of spacers may include a first spacer and a second spacer having a level lower than that of the first spacer, the first spacer faces the first seat, and the second spacer faces the second seat.

In the display device according to the present disclosure, at least a part of the bent part of at least one of the common wirings and at least one of the pixel electrodes may be superposed on each other in a laminated direction, and a region of the at least one common wiring not being the bent part and the at least one pixel electrode may not be superposed on each other in the laminated direction.

In the display device according to the present disclosure, the first substrate may further include: a first insulator; a second insulator; an organic insulator, a third insulator, and a semiconductor layer, the first insulator covers the plurality of gate lines, the semiconductor layer is on the first insulator, each of the plurality of data lines is partially located on the semiconductor layer, the second insulator covers the plurality of data lines, the organic insulator is on the second insulator, the common electrode is on the second insulator, the common wiring is on the common electrode, the third insulator covers the common electrode and the common wiring, the plurality of pixel electrodes are on the third insulator, and at least one of the seats is in a superposition region where at least one of the gate lines, the semiconductor layer, at least one of the data lines, and the organic insulator overlap on one another in the laminated direction.

In the display device according to the present disclosure, each of the common wirings may include a first common wiring extending in the row direction and a plurality of second common wirings extending in the column direction from the first common wiring, and at least one of the seats may be the second common wiring formed in the superposition region.

In the display device according to the present disclosure, the first common wiring of at least one of the common wirings may include the bent part, and at least one of the plurality of second common wirings is connected to the bent part of the first common wiring.

In the display device according to the present disclosure, at least one of the bent parts and the semiconductor layer may not overlap on each other in the laminated direction.

In the display device according to the present disclosure, the first substrate may further include an organic insulator, the common electrode is on the organic insulator, the common wiring is on the common electrode, at least one of the pixel electrodes is connected to a source electrode constituting the thin film transistor through an opening formed in the organic insulator, and each of the common wirings is partially formed in the opening.

In the display device of the present disclosure, the common wiring may be bent so as to detour around the seat, which prevents spacer from contacting with the region that is not seat.

DETAILED DESCRIPTION

Hereinafter, exemplary embodiments of the present disclosure will be described with reference to the drawings. In the exemplary embodiments, a liquid crystal display device is described as an example of display device. However the present disclosure is not limited to the liquid crystal display device. For example the present disclosure may be an organic electroluminescence display (OLED) device.

Figure 1:
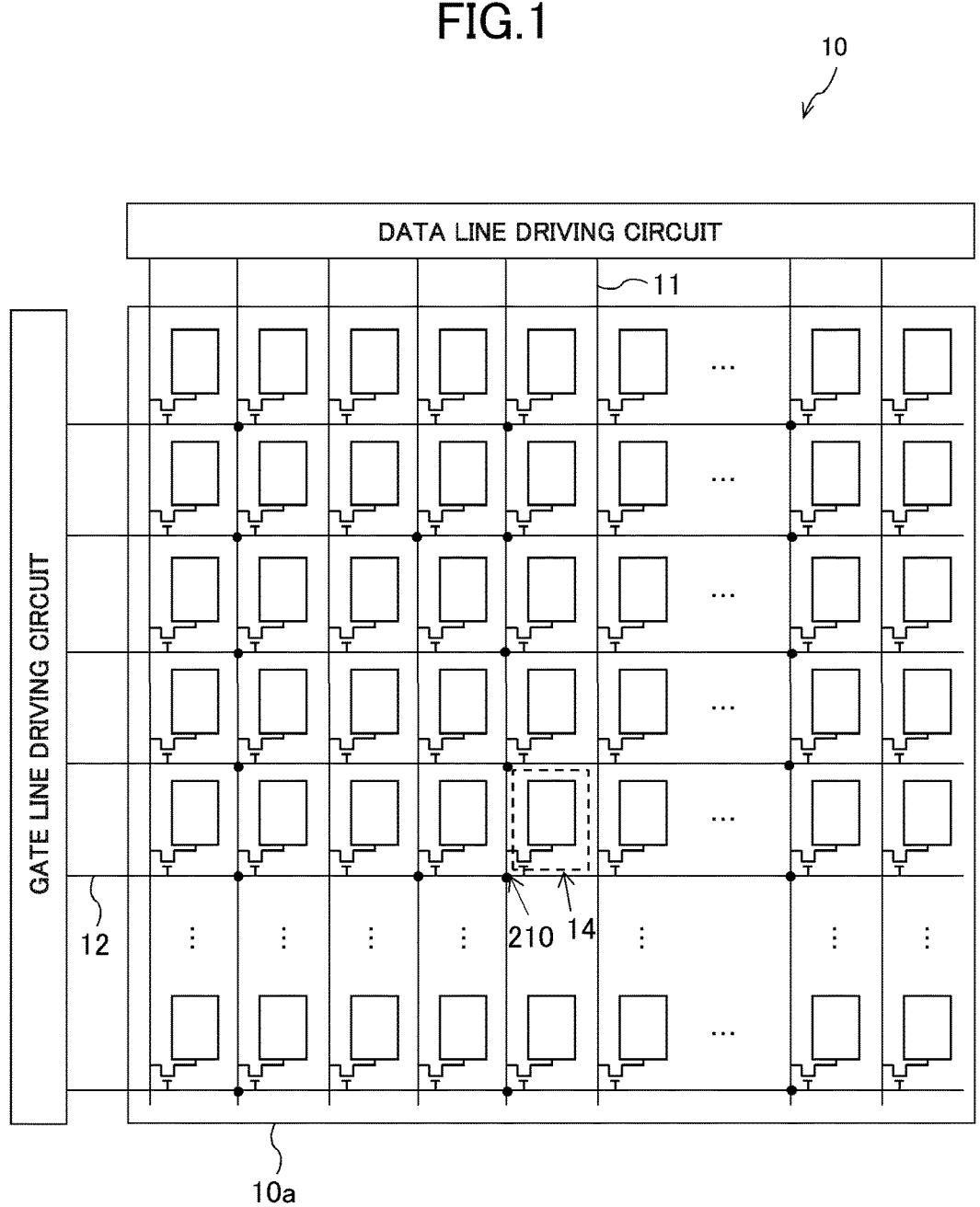
FIG. 1 is a plan view illustrating a schematic configuration of a liquid crystal display device according to an exemplary embodiment.

FIG. 1 is a perspective view illustrating an entire configuration of a liquid crystal display device according to an exemplary embodiment. The liquid crystal display device includes display panel 10 that displays an image, a driving circuit (data line driving circuit, gate line driving circuit) that drives display panel 10, a control circuit (not illustrated) that controls the driving circuit, and a backlight (not illustrated) that irradiates display panel 10 with light from a rear surface side. In display region 10a of display panel 10, pixels 14 each of which is surrounded by two adjacent data lines 11 and two adjacent gate lines 12 are arrayed into a matrix shape in row and column directions. It is assumed that the column direction is a direction in which data line 11 extends, and that the row direction is a direction in which the gate line 12 extends. Spacer 210 (to be described later) is also illustrated in FIG. 1.

Figure 2:
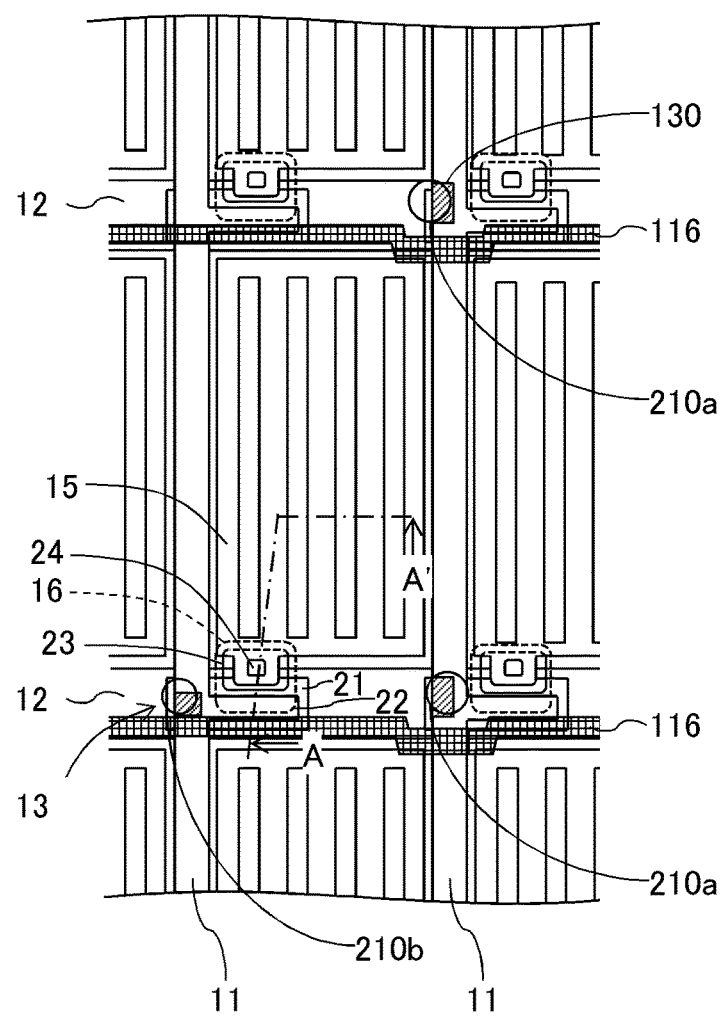
FIG. 2 is a plan view illustrating a configuration of pixels.
Figure 3:
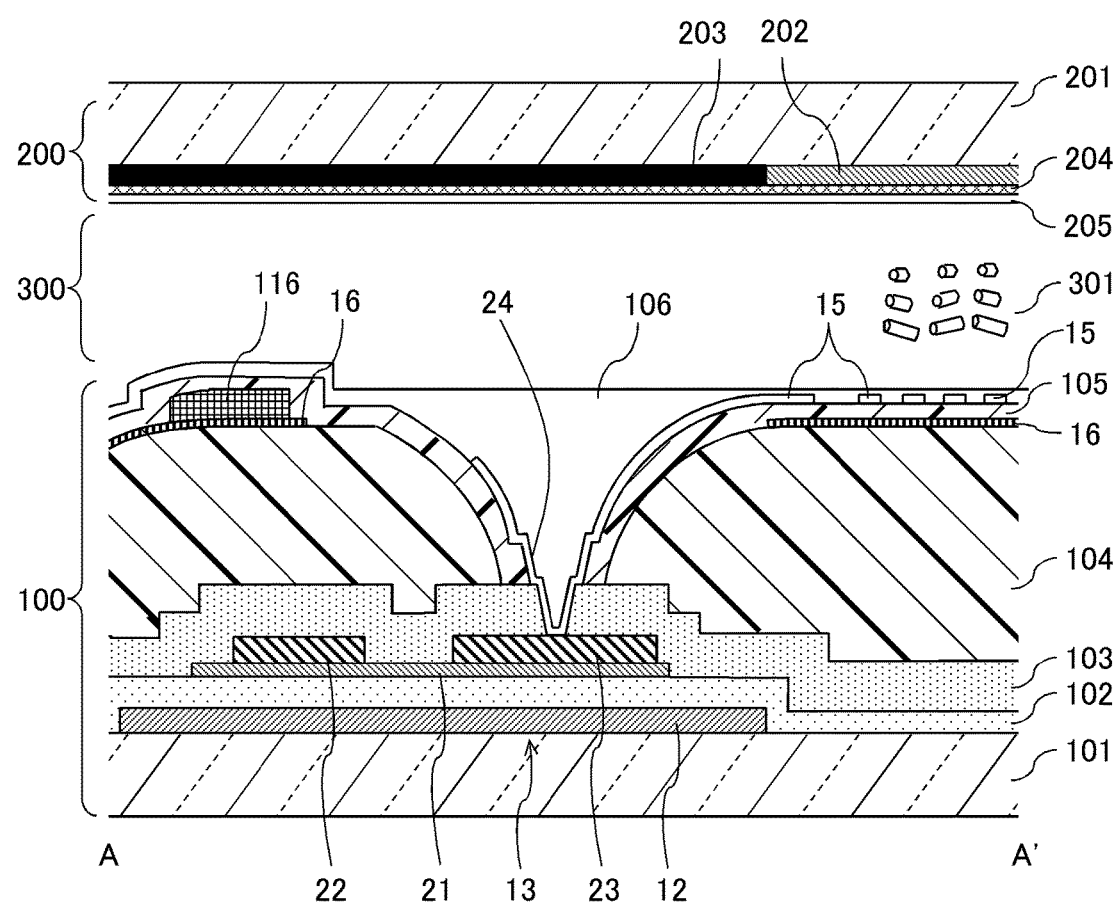
FIG. 3 is a cross-sectional view taken along a line A-A' in FIG. 2.

FIG. 2 is a plan view illustrating a configuration of pixel 14. FIG. 3 is a sectional view taken on line A-A' in FIG. 2. A specific configuration of display panel 10 will be described below with reference to FIGS. 2 and 3.

In FIG. 2, a region sectioned by two adjacent data lines 11 and two adjacent gate lines 12 corresponds to one pixel 14. Thin film transistor 13 is provided in each pixel 14. Thin film transistor 13 is formed near an intersection part of data line 11 and gate line 12. Thin film transistor 13 includes semiconductor layer 21 formed on first insulator 102, and drain electrode 22 and source electrode 23, which are formed on semiconductor layer 21 (see FIG. 3). Drain electrode 22 is electrically connected to data line 11, and source electrode 23 is electrically connected to pixel electrode 15 through contact hole 24.

Pixel electrode 15 including a transparent conductive film such as Indium Tin Oxide (ITO) is formed in each pixel 14. Pixel electrode 15 includes a plurality of openings (slit), and is formed into a stripe shape. There is no limitation to a shape and a number of the opening. One common electrode 16 including the transparent conductive film such as ITO is formed in common to pixels 14 while facing pixel electrode 15. An opening is formed to electrically connect pixel electrode 15 and source electrode 23 to each other in a region where common electrode 16 overlaps contact hole 24 and source electrode 23 of thin film transistor 13. Each pixel 14 is covered with common electrode 16 except for the region where thin film transistor 13 is formed. A plurality of common wirings 116 are electrically connected to common electrode 16. Each common wiring 116 extends in the row direction while being superposed on gate line 12.

As illustrated in FIG. 3, display panel 10 includes TFT substrate 100 (first substrate) disposed on the rear surface side, CF substrate 200 (second substrate) disposed on a display surface side, and liquid crystal layer 300 sandwiched between TFT substrate 100 and CF substrate 200.

In TFT substrate 100, gate line 12 is formed on glass substrate 101, and first insulator 102 is formed so as to cover gate line 12. A step reflecting a planar shape or a thickness of gate line 12 is generated in a surface of first insulator 102. Gate signal line 12 is formed by a metallic material mainly containing aluminum (Al), molybdenum (Mo), titanium (Ti), or copper (Cu), a plurality of laminated layers thereof, an alloy in which tungsten (w), manganese (Mn), or titanium (Ti) is added to the metallic material, or a laminated metallic layer of a combination thereof. First insulator 102 can be made of a known material.

Semiconductor layer 21 is formed on first insulator 102. Drain electrode 22 and source electrode 23 are formed on semiconductor layer 21, and second insulator 103 is formed so as to cover drain electrode 22 and source electrode 23. Organic insulator 104 is formed on second insulator 103. A step reflecting planar shapes or thicknesses of semiconductor layer 21, drain electrode 22, and source electrode 23 is generated in the surface of second insulator 103. A gently curved inclination influenced by the step generated in the surface of second insulator 103 occurs in the surface of organic insulator 104. Second insulator 103 can be made of silicon nitride (SiN) or silicon dioxide ($SiO_2$). Organic insulator 104 is made of a photosensitive organic material mainly containing acryl.

Common electrode 16 is formed on organic insulator 104, and common wiring 116 is formed on common electrode 16. The surface of common electrode 16 is formed while reflecting a surface shape of organic insulator 104. The surface of common wiring 116 is formed while reflecting the surface shape of common electrode 16. Common wiring 116 is made of a metallic material, and electrically connected to common electrode 16.

Third insulator 105 is formed so as to cover common electrode 16 and common wiring 116. The surface of third insulator 105 is formed while reflecting the surface shapes or thicknesses of common electrode 16, common wiring 116, and organic insulator 104. Third insulator 105 can be made of a known material.

Pixel electrode 15 is formed on third insulator 105, and alignment film 106 is formed so as to cover pixel electrode 15. Pixel electrode 15 is electrically connected to source electrode 23 through contact hole 24 made in second insulator 103, organic insulator 104, and third insulator 105. Alignment film 106 may be an alignment film subjected to a rubbing alignment process or a light alignment film subjected to a light alignment process.

Although not illustrated, a polarizing plate and the like are formed on TFT substrate 100.

In CF substrate 200, color filter 202 (for example, a red color filter, a green color filter, and a blue color filter) and black matrix 203 are formed on glass substrate 201, and overcoat layer 204 is formed so as to cover color filter 202 and black matrix 203. Black matrix 203 is made of a resin material in which black pigment is used or a metallic material. Overcoat layer 204 is made of an organic material.

Alignment film 205 is formed on overcoat layer 204. Alignment film 205 may be an alignment film subjected to the rubbing alignment process or a light alignment film subjected to the light alignment process.

Although not illustrated, a polarizing plate and the like are formed on CF substrate 200.

Liquid crystal 301 is sealed in liquid crystal layer 300. Liquid crystal 301 may be a negative liquid crystal having a negative dielectric anisotropy or a positive liquid crystal having a positive dielectric anisotropy.

The laminated structure of each part constituting pixel 14 is not limited to the structure in FIG. 3, but a known structure can be applied. As described above, the liquid crystal display device has the IPS-system configuration. The configuration of the liquid crystal display device is not limited to the IPS-system configuration.

A liquid crystal display device driving method will be briefly described below. A scanning gate voltage (gate-on voltage, gate-off voltage) is supplied to gate line 12 from the gate line driving circuit. A video data voltage is supplied to data line 11 from the data line driving circuit. When the gate-on voltage is supplied to gate line 12, thin film transistor 13 is put into an on state, and the data voltage supplied to data line 11 is transmitted to pixel electrode 15 through drain electrode 22 and source electrode 23. A common voltage (Vcom) is supplied to common electrode 16 from a common electrode driving circuit (not illustrated) through common wiring 116. Therefore, liquid crystal 301 is driven by an electric field from pixel electrode 15 to common electrode 16 through liquid crystal layer 300 and the opening of pixel electrode 15. Liquid crystal 301 is driven to control transmittance of light transmitted through liquid crystal layer 300, thereby displaying the image. The liquid crystal display device driving method is not limited to the above method, and a known method can be applied.

In the liquid crystal display device of the exemplary embodiment, a plurality of spacers 210 are disposed in order to hold a distance (gap) between TFT substrate 100 and CF substrate 200. Seat 130 is formed in TFT substrate 100, spacer 210 is formed in CF substrate 200, and TFT substrate 100 and CF substrate 200 adhere to each other such that seat 130 and spacer 210 contact with each other, thereby holding the gap.

Preferably spacer 210 is disposed at a position where a numerical aperture of the pixel is not degraded, for example, near thin film transistor 13. For example, as illustrated in FIG. 2, spacer 210 (main spacer 210a, sub-spacer 210b) is formed in CF substrate 200 so as to be disposed between thin film transistors 13 adjacent in the row direction in a plan view. A plurality of seats 130 are formed in TFT substrate 100, and each seat 130 holds spacer 210 when TFT substrate 100 adheres to CF substrate 200. Seat 130 is formed in the region facing spacer 210. For example, seat 130 is formed in TFT substrate 100 so as to be disposed between thin film transistors 13 adjacent in the row direction in a plan view. Spacer 210 may include two kinds of spacers having different heights. Specifically, spacer 210 may include main spacer 210a contacting with seat 130 in a normal state and sub-spacer 210b, which does not contact with seat 130 in the normal state, but contacts with seat 130 when display panel 10 is deformed. It is assumed that the number of sub-spacers 210b is lower than the number of main spacers 210a. The provision of sub-spacer 210b can achieve improvement of a pressure resistance and suppression of bubble generation during low temperature.

In the liquid crystal display device of the exemplary embodiment, the high resolution of the display panel reduces the region where seat 130 and spacer 210 are disposed, and spacer 210 contacts with the region that is not seat 130 because of the misregistration during the adhesion between TFT substrate 100 and CF substrate 200, which results in a risk of the occurrence of the display defect such as display unevenness. Particularly, because the laminated structure is raised in the region where common wiring 116 is formed, spacer 210 contacts easily to the region. In the configuration of the liquid crystal display device of the exemplary embodiment, common wiring 116 extending in the row direction is bent so as to detour around seat 130, which prevents spacer 210 from contacting with the region that is not seat 130 even if the misalignment occurs during the adhesion between TFT substrate 100 and CF substrate 200.

Figure 4:
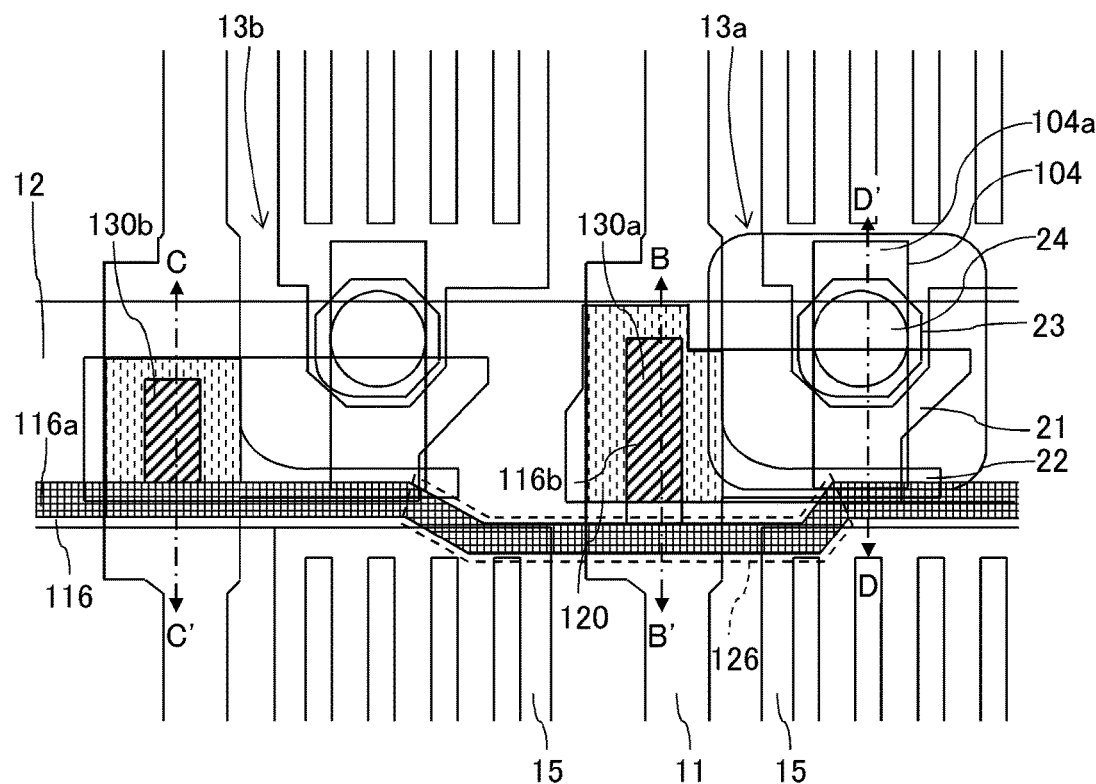
FIG. 4 is a partly expansion view illustrating a TFT substrate according to an exemplary embodiment.
Figure 4:
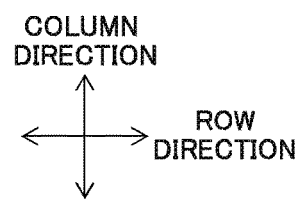
Figure 5:
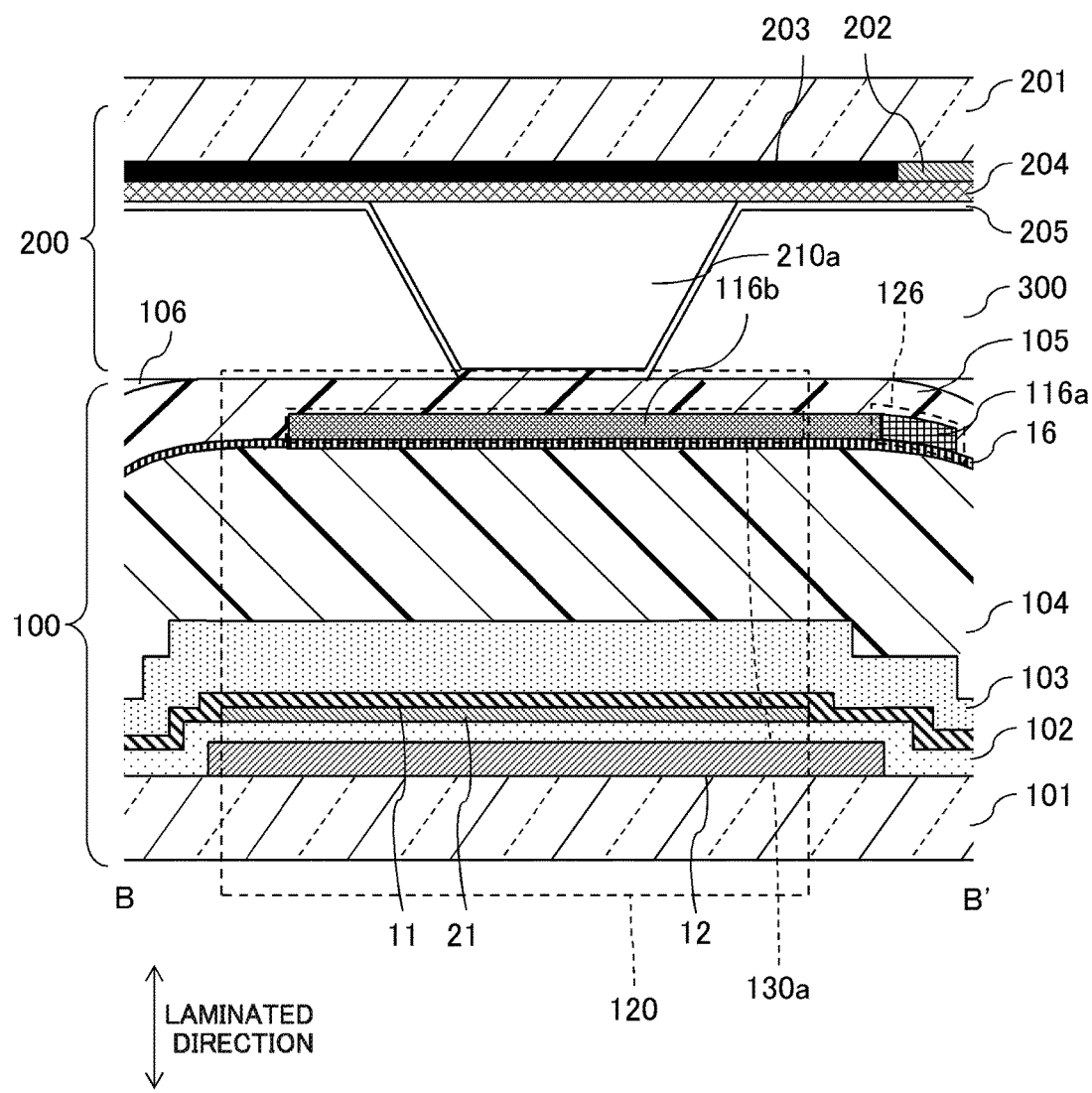
FIG. 5 is a cross-sectional view taken along a line B-B' in FIG. 4.
Figure 6:
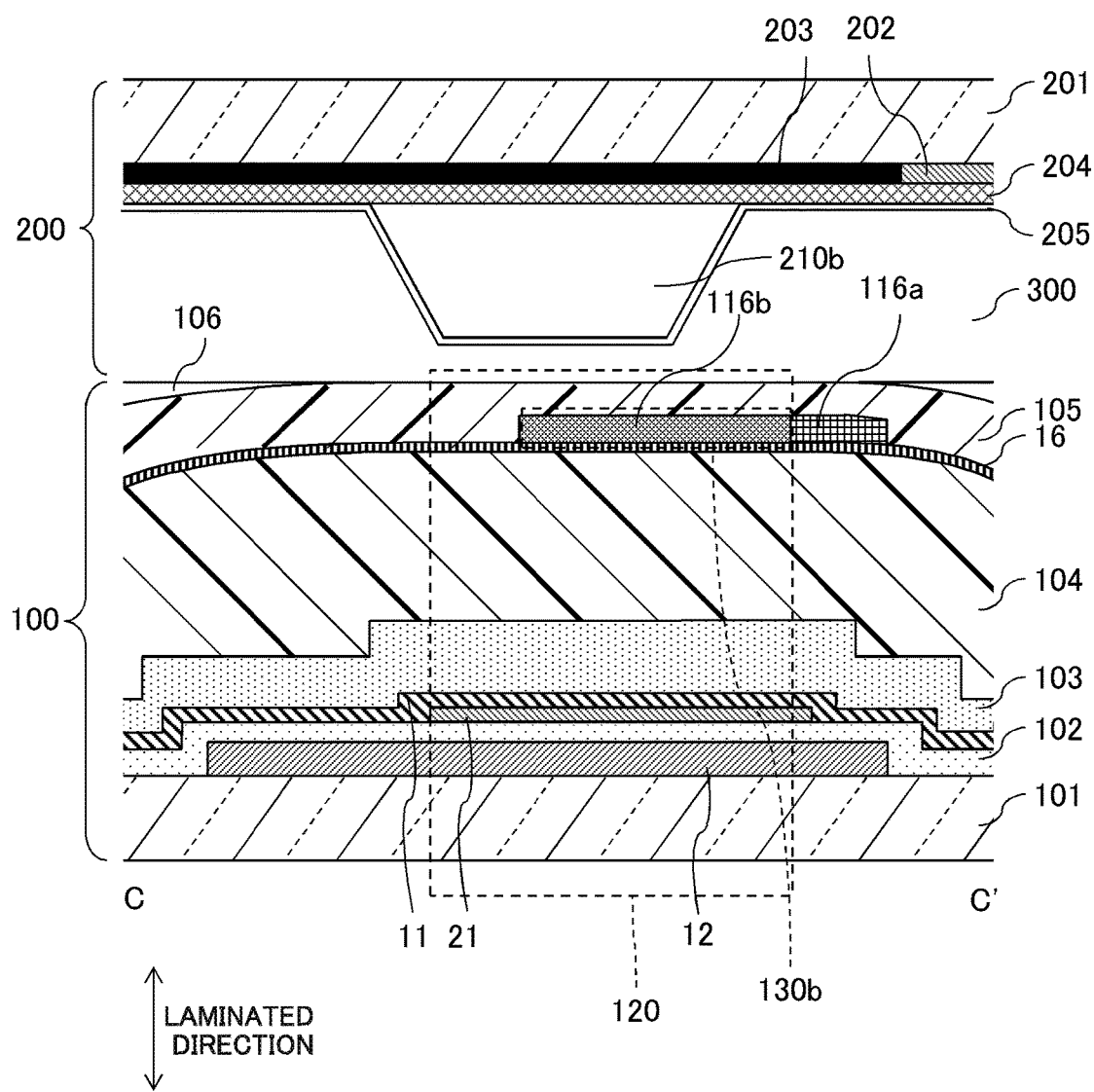
FIG. 6 is a cross-sectional view taken along a line C-C' in FIG. 4.

A specific configuration of common wiring 116 will be described below with reference to FIGS. 4 to 6. FIG. 4 is a partially enlarged view of TFT substrate 100. FIG. 4 illustrates a neighborhood of two thin film transistors 13 (thin film transistor 13a and thin film transistor 13b) adjacent in the row direction in display panel 10 of FIG. 2. FIG. 5 is a sectional view taken on line B-B' in FIG. 4. FIG. 5 is the sectional view taken on line B-B' while CF substrate 200 in which spacer 210 is formed adheres to TFT substrate 100 in FIG. 4. FIG. 6 is a sectional view taken on line C-C' in FIG. 4. FIG. 6 is the sectional view taken on line C-C' while CF substrate 200 in which spacer 210 is formed adheres to TFT substrate 100 in FIG. 4. The configuration on the side of TFT substrate 100 in FIGS. 4 to 6 is described above with reference to FIG. 3 except that the configuration on the side of TFT substrate 100 includes data line 11, common wiring 116 (first common wiring 116a and second common wiring 116b), superposition region 120, and seat 130. The configuration on the side of CF substrate 200 in FIGS. 5 and 6 is described above with reference to FIG. 3 except that the configuration on the side of CF substrate 200 includes spacer 210. Accordingly, the overlapping description is omitted.

The laminated structure in the region between two thin film transistors 13 adjacent in the row direction will be described below. In the region between two adjacent thin film transistors 13 adjacent in the row direction in TFT substrate 100, data line 11 is formed on semiconductor layer 21, second insulator 103 is formed so as to cover data line 11, and organic insulator 104 is formed on second insulator 103. The step reflecting the planar shapes or thicknesses of gate line 12, first insulator 102, and semiconductor layer 21 is generated in the surface of data line 11. The step reflecting the planar shapes or thicknesses of semiconductor layer 21 and data line 11 is generated in the surface of second insulator 103. The gently curved inclination influenced by the step generated in second insulator 103 occurs in the surface of organic insulator 104. Common electrode 16 is formed on organic insulator 104, and common wiring 116 is formed on common electrode 16. Common wiring 116 is formed while reflecting the surface shape of common electrode 16. Common wiring 116 includes first common wiring 116a that extends in the row direction between pixels 14 adjacent in the column direction and a plurality of second common wirings 116b that extend in the column direction from first common wiring 116a in the region between two thin film transistors 13 adjacent in the row direction. Third insulator 105 is formed so as to cover common electrode 16 and common wiring 116. The surface of third insulator 105 is formed while reflecting the surface shapes or thicknesses of organic insulator 104, common electrode 16, and common wiring 116.

Seat 130 is the region facing spacer 210. For example, seat 130 is formed in the region between two thin film transistors 13 adjacent in the row direction. As illustrated in FIG. 4, seat 130 includes first seat 130a holding main spacer 210a and second seat 130b holding sub-spacer 210b. Spacer 210 of the exemplary embodiment includes main spacer 210a and sub-spacer 210b, which differ from each other. Hereinafter, main spacer 210a and sub-spacer 210b are simply referred to as spacer 210 in describing the configuration common to main spacer 210a and sub-spacer 210b. Similarly, first seat 130a and second seat 130b are simply referred to as seat 130 in describing the configuration common to first seat 130a and second seat 130b.

A specific configuration of seat 130 will be described below. Seat 130 is formed in superposition region 120 where at least gate line 12, semiconductor layer 21, data line 11, and organic insulator 104 are superposed on one another in the laminated direction. Superposition region 120 is a region facing spacer 210. Specifically, seat 130 is superposition region 120 where gate line 12, semiconductor layer 21, data line 11, and organic insulator 104 are superposed on one another in the laminated direction, and is a step formed above organic insulator 104. Seat 130 is formed such that a whole outer periphery of seat 130 and superposition region 120 are superposed in the laminated direction. As described above, sometimes the gently curved inclination occurs in organic insulator 104 of TFT substrate 100 by the influence of the step of the underlying layer. Preferably seat 130 is not formed in the region where the inclination occurs. At this point, because superposition region 120 where gate line 12, semiconductor layer 21, data line 11, and organic insulator 104 are superposed on one another in the laminated direction has flatness, whole seat 130 is formed in superposition region 120. In the exemplary embodiment, common wiring 116 that is formed above organic insulator 104 in superposition region 120 is used as seat 130. Specifically, second common wiring 116b that is formed above organic insulator 104 in superposition region 120 is used as seat 130. Alternatively, both second common wiring 116b formed in superposition region 120 and third insulator 105 formed above second common wiring 116b may be used as seat 130. In superposition region 120, the region where gate line 12, semiconductor layer 21, data line 11, organic insulator 104, common electrode 16, and common wiring 116 in TFT substrate 100 are superposed on one another in the laminated direction may be defined as seat 130. Specifically, the region where gate line 12, semiconductor layer 21, data line 11, organic insulator 104, common electrode 16, and second common wiring 116b in TFT substrate 100 are superposed on one another in the laminated direction may be defined as seat 130.

Because second seat 130b does not contact with sub-spacer 210b in the normal state, a surface area of second seat 130b is formed smaller than first seat 130a. That is, a width in the column direction of second common wiring 116b in second seat 130b is narrower than that in the column direction of second common wiring 116b in first seat 130a. First seat 130a is equal to second seat 130b in a width in the row direction of second common wiring 116b. A width in the column direction of gate line 12 in the region where second seat 130b is formed may be narrower than column direction of gate line 12 in the region where first seat 130a is formed. A width in the column direction of semiconductor layer 21 in the region where second seat 130b is formed may be narrower than column direction of semiconductor layer 21 in the region where first seat 130a is formed.

In CF substrate 200, spacer 210 is formed on overcoat layer 204, and alignment film 205 is formed so as to cover spacer 210. Spacer 210 is formed in CF substrate 200 so as to overlap black matrix 203 in a plan view. As illustrated in FIG. 5, main spacer 210a is formed in CF substrate 200 such that at least a part of the surface on the side of TFT substrate 100 of main spacer 210a contacts with the surface of first seat 130a. As illustrated in FIG. 6, sub-spacer 210b is formed in CF substrate 200 so as not to contact with the surface of second seat 130b in the normal state. Spacer 210 and seat 130 may be provided in a ratio of one or a plurality of spacers 210 and seats 130 to one pixel set including a red pixel, a blue pixel, and a green pixel, or spacer 210 and seat 130 may be provided in a ratio of one to the plurality of pixel sets. Spacer 210 can be formed into a columnar shape, a prism shape, a conical shape, or the like.

Common wiring 116 includes bent part 126 that detours around at least one of the plurality of seats 130. In the exemplary embodiment, first common wiring 116a includes bent part 126, and second common wiring 116b constituting first seat 130a is connected to bent part 126.

As illustrated in FIGS. 4 and 5, first common wiring 116a extends linearly in the row direction between pixels 14 adjacent in the column direction, and bent part 126 of first common wiring 116a is formed so as to detour around first seat 130a. That is, first common wiring 116a is bent in the column direction so as to separate from first seat 130a in bent part 126. First common wiring 116a may be bent in the column direction so as to separate from superposition region 120 in bent part 126. First common wiring 116a may be bent in the column direction such that bent part 126 and semiconductor layer 21 are not superposed on each other in the laminated direction in bent part 126. First common wiring 116a may be bent in the column direction such that a part of bent part 126 and gate line 12 are not superposed on each other in the laminated direction in bent part 126.

At this point, first common wiring 116a does not detour around second seat 130b that does not contact with sub-spacer 210b in the normal state, but detours around first seat 130a that contacts with main spacer 210a in the normal state. Accordingly, first common wiring 116a may be superposed on superposition region 120, semiconductor layer 21, gate line 12, and in the laminated direction in the region where second seat 130b is formed. Specifically, as illustrated in FIGS. 4 and 6, first common wiring 116a and second seat 130b are formed so as to contact with each other in a plan view. First common wiring 116a and gate line 12 are superposed on each other in the laminated direction in the region where second seat 130b is formed. A part of first common wiring 116a and semiconductor layer 21 are superposed on each other in the laminated direction in the region where second seat 130b is formed.

Bent part 126 and first seat 130a separate from each other in the column direction, which allows main spacer 210a to be prevented from contacting with the region where first common wiring 116a is formed.

At least a part of bent part 126 and pixel electrode 15 are superposed on each other in the laminated direction, and the region that is not bent part 126 in first common wiring 116a and pixel electrode 15 are not superposed on each other in the laminated direction. Therefore, the degradation of the numerical aperture can be suppressed in the pixel region while main spacer 210a is prevented from contacting with the region where first common wiring 116a is formed.

Figure 7:
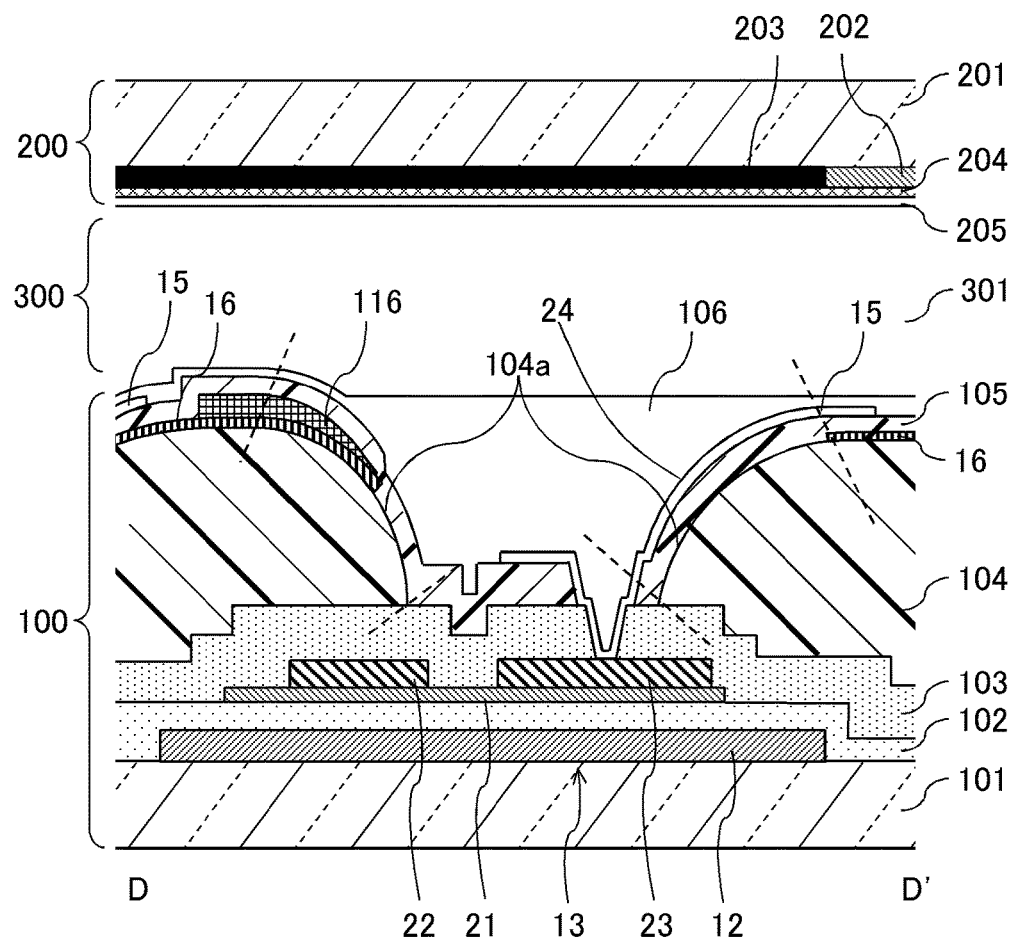
FIG. 7 is a cross-sectional view taken along a line D-D' in FIG. 4.

As illustrated in FIG. 4, opening 104a is formed to electrically connect pixel electrode 15 and source electrode 23 to each other in the region where organic insulator 104 overlaps contact hole 24 and source electrode 23 of thin film transistor 13. FIG. 7 is a sectional view taken on line D-D' in FIG. 4. Preferably a part of the common wiring is formed near the position of organic insulator 104 in the region where thin film transistor 13 is formed. Specifically, as illustrated in FIG. 4, first common wiring 116a is formed such that first common wiring 116a and opening 104a partially overlap each other in the region where gate line 12, semiconductor layer 21, and drain electrode 22 are superposed on one another in a plan view. That is, a part of first common wiring 116a is formed in opening 104a of organic insulator 104. As illustrated in FIG. 7, parts of common electrode 16 and first common wiring 116a are formed in opening 104a of organic insulator 104. The step is generated in opening 104a of organic insulator 104 by common electrode 16 and first common wiring 116a, which are formed in opening 104a of organic insulator 104. The step facilitates entry of alignment film 106 into contact hole 24 to improve an application spread of alignment film 106.

Common wiring 116 is not limited to the above configuration. For example, first common wiring 116a and second common wiring 116b may be formed while separating from each other. That is, first common wiring 116a extending in the row direction between pixels 14 adjacent in the column direction and second common wiring 116b extending in the column direction between pixels 14 adjacent in the row direction may be separately formed. Second common wiring 116b may be formed into an island shape in the region between two thin film transistors 13 adjacent in the row direction. That is, second common wiring 116b may be made of the same material (for example, a metallic layer) as first common wiring 116a in the same layer as first common wiring 116a while separating from first common wiring 116a. In this case, second common wiring 116b may be formed such that whole second common wiring 116b is included in superposition region 120.

Seat 130 is not limited to the configuration of second common wiring 116b. For example, seat 130 may be a resin layer, which is made of a resin material and formed in superposition region 120 where gate line 12, semiconductor layer 21, data line 11, and organic insulator 104 in TFT substrate 100 are superposed on one another in the laminated direction. The resin layer may be formed on common electrode 16 in the same layer as common wiring 116, or formed on third insulator 105. In the case that the resin layer is formed on third insulator 105, the surface of the resin layer contacts with spacer 210. Thus, in the liquid crystal display device of the exemplary embodiment, the layer (such as a second common wiring 116b, a resin layer, and a metallic layer) formed in superposition region 120 where gate line 12, semiconductor layer 21, data line 11, and organic insulator 104 are superposed on one another in the laminated direction can be defined as seat 130.

First common wiring 116a in FIG. 4 is formed so as not to detour around second seat 130b that does not contact with sub-spacer 210b in the normal state. Alternatively, first common wiring 116a may be formed so as to detour around second seat 130b. Therefore, when display panel 10 is deformed, sub-spacer 210b can be prevented from contacting with the region where first common wiring 116a is formed.

In the above, the specific embodiments of the present application have been described, but the present application is not limited to the above-mentioned embodiments, and various modifications may be made as appropriate without departing from the spirit of the present application.

What is claimed is:

1. A display device comprising:
    a first substrate;
    a second substrate facing the first substrate; and
    a plurality of spacers provided between the first substrate and the second substrate,
    wherein the first substrate includes:
        a plurality of seats which hold the plurality of spacers, respectively;
        a plurality of data lines extending in a column direction;
        a plurality of gate lines extending in a row direction;
        a plurality of thin film transistors each of which is formed near a respective intersection part of the plurality of data lines and the plurality of gate lines;
        a plurality of pixel electrodes corresponding to a plurality of pixel regions, respectively, the plurality of pixel regions being arrayed in the row and column directions;
        a common electrode that faces the plurality of pixel electrodes;
        a plurality of common wirings that extend in the row direction and that are electrically connected to the common electrode;
        a first insulator;
        a second insulator;
        a third insulator; and
        a semiconductor layer, and wherein
        the first insulator covers the plurality of gate lines,
        the semiconductor layer is on the first insulator,
        each of the plurality of data lines is partially located on the semiconductor layer,
        the second insulator covers the plurality of data lines,
        the common electrode is on the second insulator,
        the plurality of common wirings are on the common electrode,
        the third insulator covers the common electrode and the plurality of common wirings,
        the plurality of pixel electrodes are on the third insulator,
        at least one of the seats is in a superposition region where at least one of the gate lines, the semiconductor layer, at least one of the data lines, and at least one of the plurality of common wirings overlap on one another in a laminated direction, and
        one of the at least one of the plurality of common wirings includes a bent part detouring around at least one of the plurality of seats.

2. The display device according to claim 1, wherein the plurality of seats includes a first seat and a second seat having a surface area smaller than that of the first seat, and
    the bent part of the one of the at least one of the plurality of common wirings is formed so as to detour around the first seat.

3. The display device according to claim 2, wherein the plurality of spacers includes a first spacer and a second spacer having a level lower than that of the first spacer,
    the first spacer faces the first seat, and the second spacer faces the second seat.

4. The display device according to claim 1, wherein at least a part of the bent part of the one of the at least one of the plurality of common wirings and at least one of the pixel electrodes are superposed on each other in a laminated direction, and a region of the one of the at least one of the plurality of common wirings not being the bent part and the at least one pixel electrode are not superposed on each other in the laminated direction.

5. The display device according to claim 1, wherein the first substrate further includes an organic insulator on the second insulator, and
the at least one of the seats is in a superposition region where at least one of the gate lines, the semiconductor layer, at least one of the data lines, the at least one of the plurality of common wirings and the organic insulator overlap on one another in the laminated direction.

6. The display device according to claim 5, wherein each of the plurality of common wirings includes a first common wiring extending in the row direction and a plurality of second common wirings extending in the column direction from the first common wiring, and
the at least one of the seats is in the superposition region where at least one of the gate lines, the semiconductor layer, at least one of the data lines, the second common wiring and the organic insulator overlap on one another in the laminated direction.

7. The display device according to claim 6, wherein the first common wiring of at least one of the plurality of common wirings includes the bent part, and at least one of the plurality of second common wirings is connected to the bent part of the first common wiring.

8. The display device according to claim 5, wherein the bent part of the one of the at least one of the plurality of common wirings and the semiconductor layer do not overlap on each other in the laminated direction.

9. The display device according to claim 1, wherein the first substrate further includes an organic insulator,
the common electrode is on the organic insulator,
the plurality of common wirings are on the common electrode,
at least one of the plurality of pixel electrodes is connected to a source electrode constituting one thin film transistor of the plurality of thin film transistors through an opening formed in the organic insulator, and
one of the at least one of the plurality of common wirings is disposed near the opening.

\* \* \* \* \*